United States Patent
Ohkawa

(10) Patent No.: US 8,737,841 B2
(45) Date of Patent: May 27, 2014

(54) COMMUNICATION METHOD USING THE ENTANGLED STATE

(76) Inventor: Narumi Ohkawa, Kuwana (JP)

( * ) Notice: Subject to any disclaimer, the term of this patent is extended or adjusted under 35 U.S.C. 154(b) by 109 days.

(21) Appl. No.: 13/506,381

(22) Filed: Apr. 17, 2012

(65) Prior Publication Data

US 2012/0237210 A1    Sep. 20, 2012

(51) Int. Cl.
*H04B 10/00*    (2013.01)
*H04B 10/06*    (2006.01)

(52) U.S. Cl.
USPC .......................... 398/152; 398/203; 398/212

(58) Field of Classification Search
USPC .......................... 398/140, 152, 202, 203, 212
See application file for complete search history.

(56) References Cited

U.S. PATENT DOCUMENTS

2003/0133714 A1* 7/2003 Gat ............................... 398/140
2008/0085121 A1* 4/2008 Tomaru ......................... 398/138

FOREIGN PATENT DOCUMENTS

JP    2010-252831 A1    5/2012

OTHER PUBLICATIONS

Phys. Rev. Lett. 75, 4337-4341(1995) Paul G. Kwiat, Klaus Mattle, Harald Weinfurter, and Anton Zeilinger. Above document shows a method to create "polarization-entangled photon pairs".

* cited by examiner

*Primary Examiner* — Daniel Dobson

(57) ABSTRACT

The sender and the receiver prepare two photons in the entangled state of polarization. The first photon of the two photons is sent to the sender and the second photon of the two photons is sent to the receiver. The sender measures the first photon after the first photon pass the polarizer in which the vertical polarized photon can pass, when the sender sends the signal "1". The sender measures the first photon after the first photon pass the polarizer in which the 45 degrees polarized photon can pass, when the sender sends the signal "0". The receiver measures the second photon by the balanced homodyne measurement. And, the receiver knows the signal from the absolute value of the result of the balanced homodyne measurement.

1 Claim, 2 Drawing Sheets

COMMUNICATION METHOD USING THE ENTANGLED STATE

FIELD

The embodiments discussed herein are related to a communication method using the entangled state, a communication method using the balanced homodyne measurement.

BACKGROUND

For current communication technology, telecommunication or optical fiber communication has been widely used.

In the communication method that uses electricity or light, the signal transmission speed is limited below speed of light.

On the other hand, the quantum communication technology or quantum cryptography based on the principle of quantum mechanics is being actively researched.

Moreover, the quantum teleportation, reproducing a quantum state in another system, is also being researched using the entangled state.

In the quantum code or the quantum teleportation, the collapse of the wave packet (decoherence) is used. The collapse of the wave packet occurs instantly when measurement is done, and a strong correlation appears in each measurement result of each part in the entangled state.

However, it is said that it is not possible to use the entangled state to send information because an individual measurement result of the entangled state is quite random, and cannot arbitrarily choose the measurement result.

Therefore, even in the quantum code or the quantum teleportation, the communication process at the speed below speed of light is needed to actually send information. So the signal transmission speed becomes below speed of light.

Related references are as follows:
Japanese Patent Publication No. 2010-252831
Phys. Rev. Lett. 75, 4337-4341(1995)
The quantum theory of light, second edition, Oxford University Press 1973, 1983

SUMMARY

According to an aspect of the first embodiment, a communication method comprising: the step that the sender and the receiver prepare two photons in the entangled state of polarization; the step that the first photon of said two photons is sent to the sender and the second photon of said two photons is sent to the receiver; the step that the sender measures the first photon after the first photon pass the polarizer in which the vertical polarized photon can pass, when the sender sends the signal "1"; the step that the sender measures the first photon after the first photon pass the polarizer in which the 45 degrees polarized photon can pass, when the sender sends the signal "0"; the step that the receiver mixes the second photon with the local oscillator light by the half beam splitter and the receiver generates the first output light and the second output light; the step that the receiver measures the intensity of said first output light and the intensity of said second output light, and derives the signal value that is the difference of those.

DESCRIPTION OF EMBODIMENTS

Preferred embodiments of the present invention will be explained with reference to accompanying drawings.

(Communication Method of the First Embodiment)

A Communication method according to the present embodiment will be described with reference to FIGS. 1 to 2. The related reference is Japanese Patent Publication No. 2010-252831.

Figure 1:
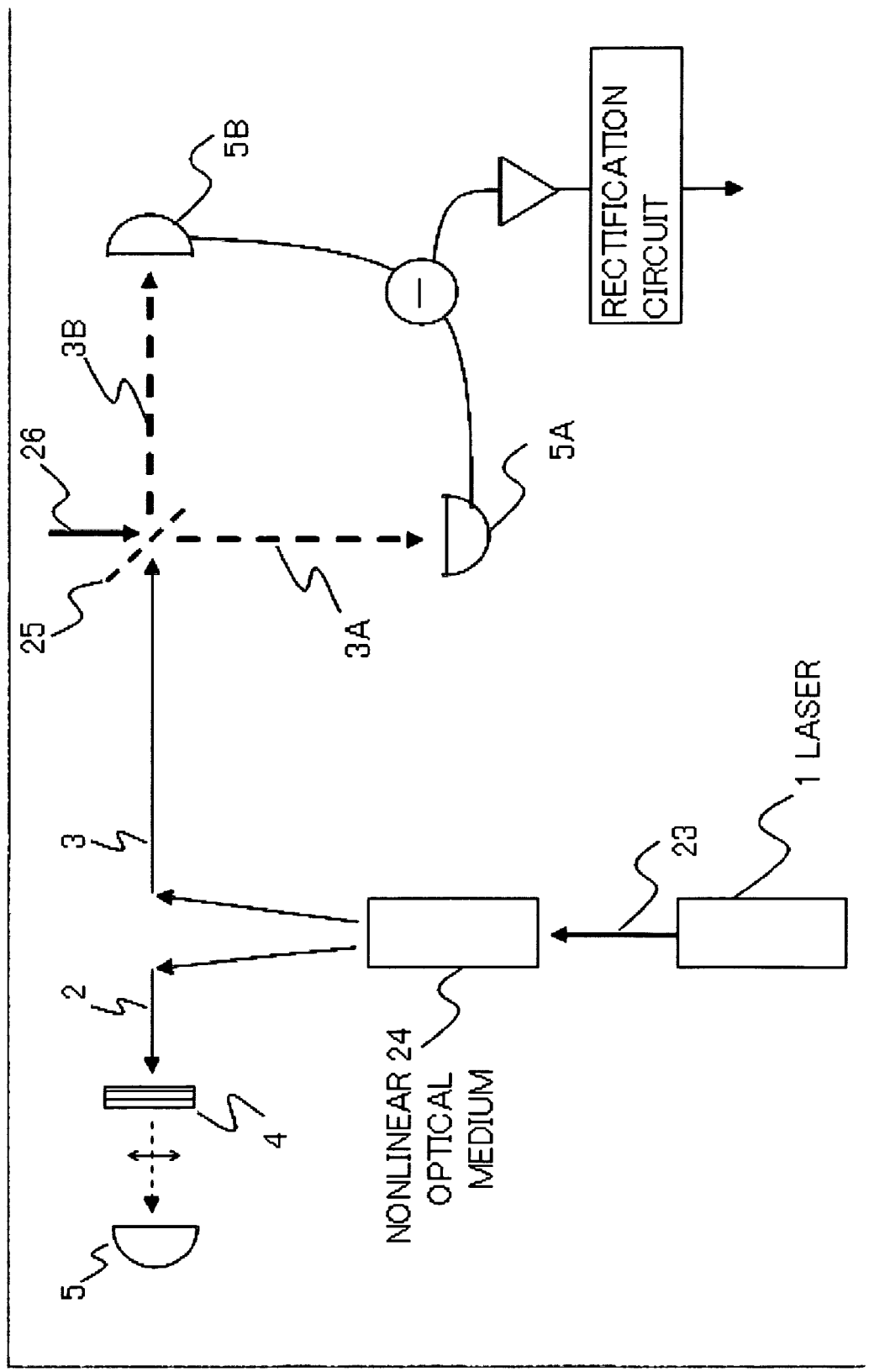
FIG. 1 is a schematic view of the instruments for the communication method of the first embodiment where the vertical polarized light can pass the polarizer 4.
Figure 2:
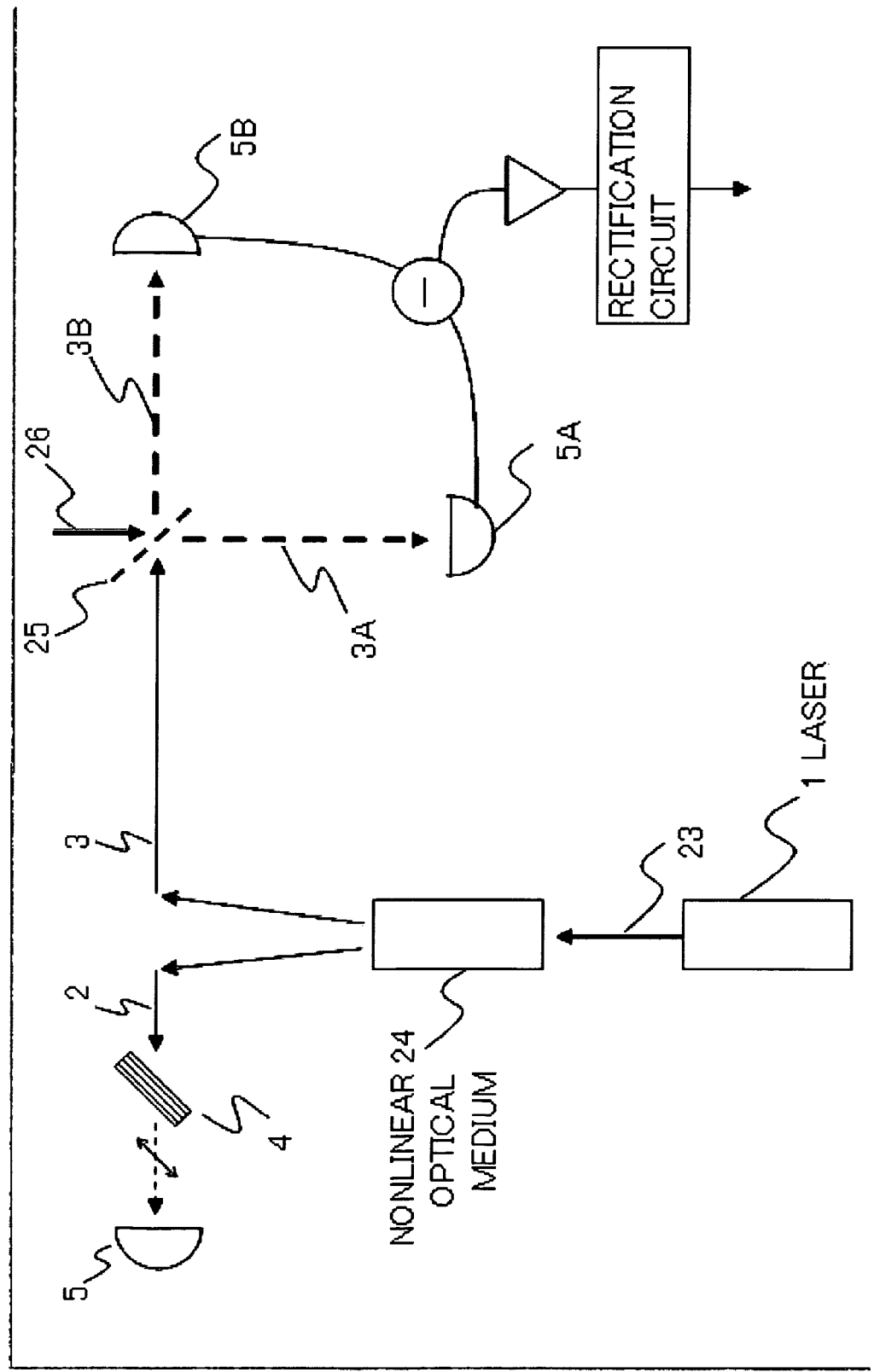
FIG. 2 is a schematic view of the instruments for the communication method of the first embodiment where the 45 degrees polarized light can pass the polarizer 4.

FIGS. 1 and 2 are schematic views of the instruments according to the present embodiment. FIG. 1 shows the case that the information is "1". And FIG. 2 shows the case that the information is "0".

The Pump light 23 radiated from the laser 1, in FIG. 1, enters into the nonlinear optical medium 24. The first photon 2 and the second photon 3 is generated from the pump light 23 by the parametric down conversion in the nonlinear optical medium 24, and the first photon 2 and the second photon 3 are in the entangled state of polarization. The method of generating the entangled state of polarization is explained, for instance, in non-patent documents, Phys. Rev. Lett. 75, 4337-4341(1995). In FIG. 1, the first photon 2 and the second photon 3 are shown by arrows. The entangled state of polarization is expressed as following equation;

$$\Phi = \frac{1}{\sqrt{2}}(|Ha\rangle|Hb\rangle + |Va\rangle|Vb\rangle)$$

$$= \frac{1}{\sqrt{2}}\left\{\frac{(|Ha\rangle+|Va\rangle)}{\sqrt{2}}\frac{(|Hb\rangle+|Vb\rangle)}{\sqrt{2}} + \frac{(|Ha\rangle-|Va\rangle)}{\sqrt{2}}\frac{(|Hb\rangle-|Vb\rangle)}{\sqrt{2}}\right\}.$$

Equation 1

In above equation, |Ha> express the horizontal polarization state of the first photon 2 propagating to the first detector 5, and |Hb> express the horizontal polarization state of the second photon 3. And |Va> express the vertical polarization state of the first photon 2, and |Vb> express the vertical polarization state of the second photon 3. Therefore, the Equation 1 means that the state in which the first photon 2 and the second photon 3 are both horizontal polarized and the state in which the first photon 2 and the second photon 3 are both vertical polarized are entangled. Because (|Ha⟩±|Va⟩)/√2 or (|Hb⟩±|Vb⟩)/√2 express ±45 degrees polarized state, the Equation 1 also means that the first photon 2 and the second photon 3 are both +45 degrees polarized or both −45 degrees polarized.

In FIG. 1, only the vertical polarized component of the first photon 2 reaches the first detector 5 through polarizer 4 in which the vertical polarized light can pass. The first photon 2 that had passed polarizer 4 was shown in the FIG. 1 by a dotted line arrow. When the first photon 2 is detected at the first detector 5, it is fixed that the first photon 2 is a vertical polarized light. Moreover, when the first photon 2 is not detected at the first detector 5, it is fixed that the first photon 2 is the horizontal polarized light.

The collapse of the wave packet occurs by above-mentioned measurement of the first photon 2, and the polarization of the second photon 3 is fixed to the same polarization as the first photon 2 in FIG. 1. This is a characteristic of the above-mentioned entangled state.

The second photon 3 enters into half beam splitter 25 after the measurement of the first photon 2. At this time, the local oscillator light 26 also enters into half beam splitter 25. Then the second photon 3 and the local oscillator light 26 are mixed, and the first output light 3A and the second output light 3B are generated. The local oscillator light 26 must have enough stronger intensity than the second photon 3, and the local oscillator light 26 has vertical polarization. Here the half beam splitter 25 can be set so that the second photon 3 and the local oscillator light 26 are mixed with the opposite phase in the first output light 3A, and the second photon 3 and the local oscillator light 26 are mixed with the same phase in the second output light 3B.

Therefore, the intensity of the first output light 3A and the intensity of the second output light 3B is expressed as the Equation 2. In the Equation 2, the sign of ES is plus in the second output light 3B and the sign of ES is minus in the first output light 3A. Here, ES shows the photoelectric field of the second photon 3, and EL shows the photoelectric field of the local oscillator light 26. ES* shows complex conjugate of ES and EL* show the complex conjugate of EL. EL*·ES or EL·ES* shows the inner product of the photoelectric field vectors. The factor of 1/2 originates in the division of light into two output lights by the half beam splitter 25. Now the second power of ES is omitted in the second line of the Equation 2 because it is assumed that the local oscillator light 26 is much strongéer than the second photon 3. In Equation 2, the term δ that depends on photoelectric field ES (or ES*) of the second photon 3 is made of inner product of ES (or ES*) and EL* (or EL). Because the local oscillator light 26 has the vertical polarization, only the vertical polarization component of ES will be taken.

$$|EL + ES|^2 = \{|EL|^2 \pm (EL^* \cdot ES + EL \cdot ES^*) + |ES|^2\}/2 \quad \text{Equation 2}$$
$$\cong \{|EL|^2 \pm (EL^* \cdot ES + EL \cdot ES^*)\}/2$$
$$= \{\beta \pm \delta\}/2$$
$$\beta = |EL|^2$$
$$\delta = (EL^* \cdot ES + EL \cdot ES^*)$$

Next, the intensity of the first output light 3A is measured by the second detector 5A, and the intensity of the second output light 3B is measured by third detector 5B. According to Equation 2, the intensity of the first output light 3A is (β−δ)/2, and the intensity of the second output light 3B is (β+δ)/2. So, the signal value which is the difference of those two intensities becomes αδ. Above method to obtain the difference of the intensity of the two output lights from half beam splitter is known as balanced homodyne measurement. Here, α is the constant that express the sensitivity of the detector. Because δ is made of inner product of ES (or ES*) and EL* (or EL), the signal value is αδ1 when the second photon 3 is vertical polarized. And the signal value is 0 when the second photon 3 is horizontal polarized.

In FIG. 2, only the 45 degrees polarized component of the first photon 2 reaches the first detector 5 through polarizer 4 in which the 45 degrees polarized light can pass. The first photon 2 that had passed polarizer 4 was shown in FIG. 2 by a dotted line arrow. When the first photon 2 is detected at the detector 5, it is fixed that both the first photon 2 and the second photon 3 are 45 degrees polarized light. Moreover, when the first photon 2 is not detected at the first detector 5, it is fixed that both the first photon 2 and the second photon 3 are −45 degrees polarized light.

Next, the second photon 3 enters into half beam splitter 25. The local oscillator light 26 also enters into half beam splitter 25 as well as the case of FIG. 1. The second photon 3 and local oscillator light 26 are mixed, and the first output light 3A and the second output light 3B are generated. Here, local oscillator light 26 has the same intensity and the same polarization (vertical polarization) as in the case of FIG. 1. Here, δ that is made of inner product of ES (or ES*) and EL* (or EL) becomes δ1/√2, because the photoelectric field of the second photon 3 and the photoelectric field of the local oscillator light 26 make 45 degrees angle.

Then, the intensity of the first output light 3A is measured by the second detector 5A, and the intensity of the second output light 3B is measured by the third detector 5B. And, in this case, the signal value which is the difference of above two intensities becomes αδ1/√2. So, we can distinguish the case of FIG. 1 and the case of FIG. 2 by measuring the signal value.

Above discussion is based on the view point of the intensity of light. On the other hand, in the view point of the quantum mechanics, the probability of absorption of photon in semiconductor detector is proportional to the value expressed as follows, $$\sum_{i=x,y,z} \left| \int \phi_f \begin{matrix} [x \cdot (EL+ES)_x + y \cdot \\ (EL+ES)_y + z \cdot (EL+ES)_z] \end{matrix} \phi_i dr \right|^2 = \quad \text{Equation 3}$$

$$\sum_{i=x,y,z} \left| \int \phi_f [x \cdot (ES)_x + y \cdot (ES)_y + z \cdot (EL+ES)_z] \phi_i dr \right|^2 \cong$$

$$\left| \int \phi_f [z \cdot (EL+ES)_z] \phi_z dr \right|^2$$

where $\Phi_f$ and $\Phi_i$ are the final state and the initial state of electron. And (EL+ES)z or (ES)x means z-component or x-component of the photoelectric field vector. In the case of Si detector, $\Phi_i$ is P-state and $\Phi_f$ is S-state. So if vertical polarization corresponds to z-axis, $|\int \Phi_f[z \cdot (EL+ES)_z]\Phi_z dr|^2$ is dominant taking account of symmetry, where $\Phi_z$ is Pz-state. So z-component (vertical component) of the photoelectric field ES is taken, and the same result is obtained. The probability of absorption of photon is explained in chapter 2 of "The quantum theory of light, second edition, Oxford University Press 1973, 1983".

Now, a method of communication using above-mentioned phenomenon is explained. The sender and the receiver prepare two photons in the entangled state of polarization. The first photon 2 of said two photons is sent to the sender and the second photon 3 of said two photons is sent to the receiver.

When the sender sends the signal "1", the sender measures the first photon 2, at the time 1, after the first photon 2 pass the polarizer 4 in which the vertical polarized photon can pass. And when the sender sends the signal "0", the sender measures the first photon 2, at the time 1, after the first photon 2 pass the polarizer 4 in which the 45 degrees polarized photon can pass.

The receiver mixes the second photon 3 with the local oscillator light 26 in the half beam splitter 25, at the time 2 after the time 1, and generates the first output light 3A and the second output light 3B.

The receiver measures the intensity of said first output light 3A and the intensity of said second output light 3B, and derives the signal value that is the difference of those. And, the receiver knows that the signal is "1" in the case that the absolute value of the signal value is 0 or αδ1. Moreover, the receiver knows that the signal is "0" in the case that the absolute value of the signal value is $\alpha\delta1/\sqrt{2}$. The rectification circuit can be utilized to obtain the absolute value of the signal value, as shown in FIG. 1 and FIG. 2.

In the above-mentioned method, two selections whether the sender measures the state of the polarization of the first photon 2 in the vertical direction or in 45 degrees direction are used for communication. Because the measurement result is not used to transmit the information, the randomness of the measurement result of the entangled state doesn't matter. Actually when the sender measures the polarization of the first photon 2 in the vertical direction, the result of the measurement is the vertical polarization or the horizontal polarization. And when the sender measures the polarization of the first photon 2 in the 45 degrees direction, the result of the measurement is the 45 degrees polarization or the −45 degrees polarization.

We can also use the entangled state expressed in following Equation 4 or Equation 5, instead of the entangled state of Equation 1.

$$\Phi = \frac{1}{\sqrt{2}}(|Ha\rangle|Vb\rangle \pm |Va\rangle|Hb\rangle) \quad \text{Equation 4}$$

$$\Phi = \frac{1}{\sqrt{2}}(|Ha\rangle|Hb\rangle - |Va\rangle|Vb\rangle) \quad \text{Equation 5}$$

In Equation 4, the polarization of the first photon 2 and the polarization of the second photon 3 are "vertical and horizontal" or "horizontal and vertical". In Equation 5, only the sign of the second term is different from the equation 1. In the Equation 4 or the Equation 5, the same communication method explained above can be used.

It is also possible to repeat the above-mentioned measurement and calculate the integration of multiple results. So the communication accuracy can be improved.

In this case, the direction of polarization is vertical and 45 degrees. But instead of 45 degrees any angle $\beta$ around 45 degrees can be used. If the angle $\beta$ ($0<\beta<90$ degrees) is used, the signal value becomes $\alpha\delta1 \cos\beta$ or $\alpha\delta1 \sin\beta$. And above signal value can be distinguished from $\alpha\delta1$ or 0. So the same method can be used.

What is claimed is:

1. a method of communication comprising;
   a step that a first photon and a second photon in an entangled state of polarization are prepared;
   a step that the first photon is sent to a sender, and the second photon is sent to a receiver;
   a step that the sender measures the first photon after the passage of the first photon through a polarizer in which a vertical polarized photon can pass when the sender sends a signal "1", while the sender measures the first photon after the passage of the first photon through a polarizer in which a 45 degrees polarized photon can pass when the sender sends a signal "0";
   a step that the receiver mixes the second photon with a local oscillator light in a half beam splitter, and generates a first output light and a second output light;
   a step that the receiver measures the intensity of said first output light and the intensity of said second output light, and derives a signal value which is the difference of those;
   a step that the receiver obtains an absolute value of the signal value.

* * * * *